United States Patent
Tian et al.

(10) Patent No.: US 11,595,730 B2
(45) Date of Patent: Feb. 28, 2023

(54) SIGNALING LOUDNESS ADJUSTMENT FOR AN AUDIO SCENE

(71) Applicant: TENCENT AMERICA LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: TENCENT AMERICA LLC, Pala Alto, CA (US)

( * ) Notice: Subject to any disclaimer, the term of this patent is extended or adjusted under 35 U.S.C. 154(b) by 0 days.

(21) Appl. No.: 17/501,749

(22) Filed: Oct. 14, 2021

(65) Prior Publication Data

US 2022/0286751 A1 Sep. 8, 2022

Related U.S. Application Data

(60) Provisional application No. 63/158,261, filed on Mar. 8, 2021.

(51) Int. Cl.
| | |
|---|---|
| *H04N 21/485* | (2011.01) |
| *G10L 25/78* | (2013.01) |
| *H04N 21/439* | (2011.01) |
| *H04N 21/81* | (2011.01) |

(52) U.S. Cl.
CPC ......... *H04N 21/4852* (2013.01); *G10L 25/78* (2013.01); *H04N 21/4394* (2013.01); *H04N 21/8106* (2013.01)

(58) Field of Classification Search
None
See application file for complete search history.

(56) References Cited

U.S. PATENT DOCUMENTS

| | | | | |
|---|---|---|---|---|
| 2014/0140537 A1* | 5/2014 | Soulodre | ................ | H03G 9/025 381/104 |
| 2017/0302240 A1* | 10/2017 | Robinson | ................ | G06F 3/165 |
| 2019/0362735 A1* | 11/2019 | Muench | ................... | H04R 3/00 |

OTHER PUBLICATIONS

"Draft MPEG-I Immersive Audio Call for Proposals" ISO/IEC JTC 1/SC 29/WG6 N0032 MPEG Audio Coding Convenorship: US, Jan. 15, 2021 (14 pages) https://isotc.iso.org/livelink/livelink/open/jtc1sc29wg6.

(Continued)

*Primary Examiner* — Omar S Parra
(74) *Attorney, Agent, or Firm* — Arentfox Schiff LLP (57) ABSTRACT

Aspects of the disclosure include methods, apparatuses, and non-transitory computer-readable storage mediums for loudness adjustment for an audio scene associated with an MPEG-I immersive audio stream. One apparatus includes processing circuitry that receives a first syntax element indicating a number of sound signals included in the audio scene. The processing circuitry determines whether one or more speech signals are included in the sound signals indicated by the first syntax element. The processing circuitry determines a reference speech signal from the one or more speech signals based on the one or more speech signals being included in the sound signals. The processing circuitry adjusts a loudness level of the reference speech signal of the audio scene based on an anchor speech signal. The processing circuitry adjusts loudness levels of the sound signals based on the adjusted loudness level of the reference speech signal.

20 Claims, 3 Drawing Sheets

(56) References Cited

OTHER PUBLICATIONS

Appendix A. "Reproduction Level Adjustment for CfP Test" (6 pages).
International Search Report and Written Opinion dated Jan. 18, 2022 in International Patent Application No. PCT/US21/55272, 16 pages.

* cited by examiner

SIGNALING LOUDNESS ADJUSTMENT FOR AN AUDIO SCENE

INCORPORATION BY REFERENCE

The present application claims the benefit of priority to U.S. Provisional Application No. 63/158,261, "SIGNALING LOUDNESS ADJUSTMENT FOR AUDIO SCENE," filed on Mar. 8, 2021, which is incorporated by reference herein in its entirety.

TECHNICAL FIELD

The present disclosure describes embodiments generally related to signaling information of a loudness adjustment for an audio scene.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
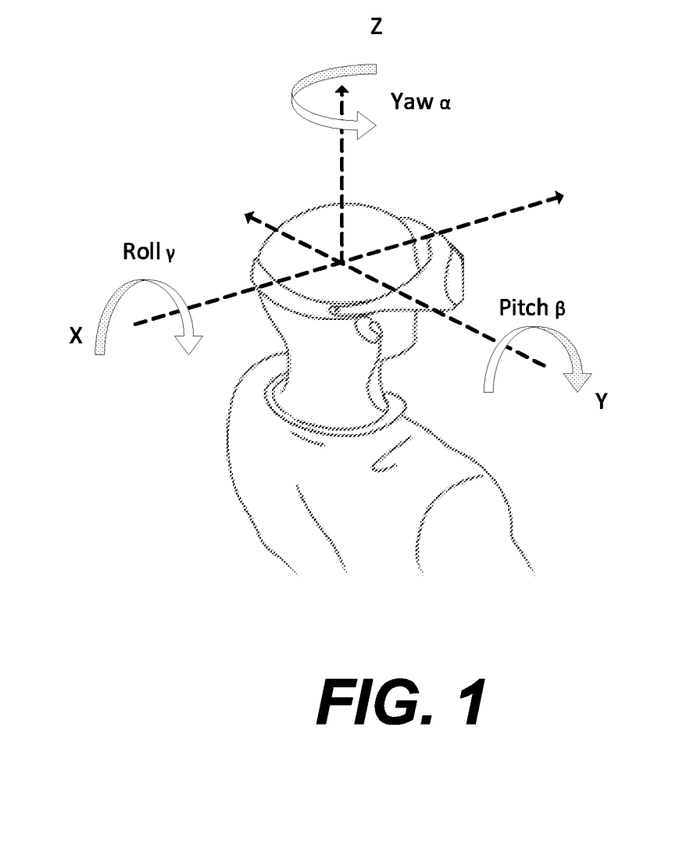
FIG. 1 shows an example of 6 degrees of freedom according to an embodiment of the disclosure.

Moving Picture Experts Group (MPEG) has proposed a suite of standards including immersive audio, immersive video, and systems support. The suite of standards can support a virtual reality (VR) or an augmented reality (AR) presentation in which a user can navigate and interact with an environment using 6 degrees of freedom (6 DoF). FIG. 1 shows an example of 6 degrees of freedom according to an embodiment of the disclosure. In FIG. 1, the 6 degrees of freedom can be represented by a spatial navigation (x, y, z) and a user head orientation (yaw, pitch, roll).

A goal in MPEG-I presentations is to impart a feeling that a user is actually present in a virtual world. Audio signals in the virtual world (or virtual scene) are perceived as in the real world, with sounds coming from an associated visual figure. That is, sounds are perceived with a correct location and a correct distance. A physical movement of the user in the real world is perceived as a matching movement in the virtual world. Furthermore and importantly, the user can interact with the virtual scene, so the sounds should be perceived as realistic and match the user's experience in the real world.

In an interactive VR/AR test, different sound levels are involved in a listening test setup. Relations of these sound levels can be given by the technical setup, or be normalized by loudness measurements, or be set manually. A procedure for scene loudness adjustment is described as a part of call of proposals (CfP) of the MPEG-I immersive audio.

SUMMARY

Aspects of the disclosure provide apparatuses for loudness adjustment for an audio scene associated with an MPEG-I immersive audio stream. One apparatus includes processing circuitry that receives a first syntax element indicating a number of sound signals included in the audio scene. The processing circuitry determines whether one or more speech signals are included in the sound signals indicated by the first syntax element. The processing circuitry determines a reference speech signal from the one or more speech signals based on the one or more speech signals being included in the sound signals. The processing circuitry adjusts a loudness level of the reference speech signal of the audio scene based on an anchor speech signal. The processing circuitry adjusts loudness levels of the sound signals based on the adjusted loudness level of the reference speech signal.

In an embodiment, the processing circuitry receives a second syntax element indicating whether the one or more speech signals are included in the sound signals. The processing circuitry determines that the one or more speech signals are included in the sound signals based on the second syntax element indicating that the one or more speeches signals are included in the sound signals.

In an embodiment, the processing circuitry receives a plurality of third syntax elements, each of the third syntax elements indicating whether a respective one of the sound signals is a speech signal. The processing circuitry determines that the one or more speech signals are included in the sound signals based on at least one of the third syntax elements indicating that the respective one of the sound signals is the speech signal.

In an embodiment, the processing circuitry receives a fourth syntax element indicating a number of the one or more speech signals included in the sound signals. The processing circuitry determines that the one or more speech signals are included in the sound signals based on the number of the one or more speech signals indicated by the fourth syntax element being greater than zero.

In an embodiment, the processing circuitry receives a fifth syntax element indicating the reference speech signal based on a number of the one or more speech signals being greater than one.

In an embodiment, the processing circuitry receives a plurality of sixth syntax elements, each of the sixth syntax elements indicating an identification index of a respective one of the sound signals.

In an embodiment, the processing circuitry determines that no speech signal is included in the sound signals. The processing circuitry adjusts the loudness levels of the sound signals based on a default reference signal.

Aspects of the disclosure provide methods for loudness adjustment for an audio scene associated with an MPEG-I immersive audio stream. In one method, a first syntax element indicating a number of sound signals included in the audio scene is received. Whether one or more speech signals are included in the sound signals indicated by the first syntax element is determined. A reference speech signal from the one or more speech signals is determined based on the one or more speech signals being included in the sound signals. A loudness level of the reference speech signal of the audio scene is adjusted based on an anchor speech signal. Loudness levels of the sound signals are adjusted based on the adjusted loudness level of the reference speech signal.

Aspects of the disclosure also provide non-transitory computer-readable mediums storing instructions which when executed by at least one processor cause the at least one processor to perform any one or a combination of the methods for loudness adjustment for an audio scene associated with an MPEG-I immersive audio stream.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Loudness Adjustment for Audio Scene

This disclosure includes signaling methods for scene loudness adjustment.

According to aspects of the disclosure, a scene creator can provide an anchor speech signal as a reference signal to adjust the scene loudness. For sound signals in an audio scene, a procedure for scene loudness adjustment can be described as follows.

The loudness adjustment between a scene sound and a specified anchor signal should be done by the scene creator (or content creator). In an example, the scene sound can be a pulse-code modulation (PCM) audio signal used in an encoder input format (EIF). Pulse-code modulation (PCM) is a method used to digitally represent sampled analog signals. The EIF describes the structure and representation of the scene metadata information that the MPEG-I immersive audio encoder reads and compresses. A general binaural renderer (GBR) with a Dirac head related transfer function (HRTF) can be used by the content creator for the loudness adjustment.

One or more (e.g., one or two) measurement points can be defined in the scene. These measurement points should represent positions on a scene task path representing normal loudness for this scene.

The scene creator can record the scene output signal with the GBR with the Dirac HRTF at these positions and use the resulting audio files (e.g., way-files) to compare with the reference signal, and determine necessary adjustments to the scene loudness level.

If a speech signal is present in the scene, in one example, one measurement position can be about 1.5 m apart from the speech source. Then, a loudness level of the speech signal at this measurement position can be adjusted to the same loudness level as the anchor speech signal.

The loudness levels of all other sound signals in the scene can be adjusted based on the loudness level of the speech signal. For example, each of the loudness levels of all other sound signals can be multiplied by a respective scaler based on the loudness level of the refined speech signal.

If no speech signal is present in the scene, the loudness levels of the sound signals in the scene can be adjusted in comparison to the anchor speech signal.

In addition, the loudest point on the scene task path should be identified by the scene creator. The loudness level at the loudest point should be checked to be free of clipping. Edge cases of clipping should be prevented, for example, when a listener abnormally approaches the sound source. Adjusting the sound level for the abnormal approach is the work of the renderer in an embodiment.

Then, the soft points or areas on the scene task path should be checked for not being too silent. For example, no long periods of silence should be on the scene task path.

In some embodiments, it is important to determine a reference signal based on the sound signals in the audio scene and adjust the reference signal to the same loudness level as the anchor signal. Without determining the reference signal, the scalers of the sound signals may not be determined. For example, if there are two sound signals A (loudness is 5) and B (loudness is 20) in the audio scene and the loudness of the anchor speech signal is 10, without determining the reference signal, it may not be clear that either the sound signal A is scaled up to 10 or the sound signal B is scaled down to 10. In this case, one possible solution is that both the sound signals A and B are adjusted to the same loudness level (e.g., 10) as the anchor speech signal. This solution may not be desired in some applications. Therefore, if the reference signal is determined based on the sound signals in the audio scene, the scalers of the sound signals can be determined. For example, if the sound signal A is selected as the reference signal, then the sound signal A can be scaled up to 10 with a scaler of 2 and the sound signal B can be scaled up to 40 with the same scaler of 2. In addition, a speech signal in the audio scene can be selected as the reference signal because of the anchor speech signal.

According to aspects of the disclosure, when two or more speech signals are present in the audio scene, scene loudness adjustment can be performed as follows.

The loudness adjustment between a scene sound and a specified anchor signal can be performed by the scene creator (or content creator). In an example, the scene sound can be the PCM audio signal used in the EIF. The GBR with the Dirac HRTF can be used by the content creator for the loudness adjustment.

One or more (e.g., one or two) measurement points can be defined in the scene. These measurement points should represent positions on a scene task path representing normal loudness for this scene.

The scene creator can record the scene output signal with the GBR and the Dirac HRTF at these positions and use the resulting audio files (e.g., way-files) to compare with the reference signal, and determine necessary adjustments to the scene loudness level.

If two or more speech signals are present in the scene, an adjusted speech signal can be created. Then, a loudness level of the adjusted speech signal can be further adjusted to the same loudness as the anchor speech signal. After that, the adjusted speech signal can be used as a refined speech signal.

The loudness levels of all other sound signals in the scene can be adjusted based on the loudness level of the refined speech signal. For example, each of the loudness levels of all other sound signals can be multiplied by a respective scaler based on the loudness level of the refined speech signal.

In addition, the loudest point on the scene task path can be identified by the scene creator. The loudness level at the loudest point should be checked to be free of clipping. Edge cases of clipping should be prevented, for example, when a listener abnormally approaches the sound source. Adjusting the sound level for the abnormal approach is the work of the renderer in an embodiment.

Then, the soft points or areas on the scene task path should be checked for not being too silent. For example, no long periods of silence should be on the scene task path.

According to aspects of the disclosure, the adjusted speech signal can be generated from two or more speech signals present in the scene, when the two or more speech signals are present.

In an embodiment, the adjusted speech signal can be one of the speech signals present in the scene, where the selection is made by the scene creator. The selection can be indicated to the user. For example, the selection can be indicated in the bitstream or as part of the metadata associated with the audio signals.

The adjusted speech signal can be selected according to different criteria. For example, the adjusted speech signal can be selected based on at least one characteristic of, or at least one mathematical relationship between, one or more of the speech signals. For example, the adjusted speech signal can be determined based on sound level or volume. In an embodiment, the adjusted speech signal can be the loudest speech signal present in the scene. In an embodiment, the adjusted speech signal can be the quietest speech signal present in the scene.

In some embodiments, the adjusted speech signal can be determined based on an average or median of the speech signals or a subset of the speech signals. Further, the average can be weighted in some embodiments. In an embodiment, the adjusted speech signal can be an average of all speech signals present in the scene. In an embodiment, the adjusted speech signal can be an average of the loudest speech signal and the quietest speech signal present in the scene. In an embodiment, the adjusted signal can be a median of all speech signals present in the scene. In an embodiment, the adjusted signal can be an average of a quantile of all speech signals present in the scene, for example, a quantile of 25% to 75%. In an embodiment, the adjusted signal can be a weighted average of all speech signals present in the scene, where the weights can be distance based or loudness based.

In some embodiments, the adjusted speech signal can be determined based on clustering of the speech signals. For example, the adjusted signal can be a speech signal which is located closest to a clustering center of all speech signals present in the scene.

It is noted that methods included in this disclosure can be used separately or in any combination. The methods can be used in part or as a whole.

This disclosure includes signaling methods for the scene loudness adjustment. In the signaling methods, the necessary information for the adjustments can be indicated. The signaling information can be a part of a bitstream or a part of metadata. The signaling information can be communicated between parties, for example, a sender and a receiver. After receiving the signaling information, the receiver can use such information to determine whether and how to adjust the signal levels of sound signals received.

In some embodiments the signaling information can specify whether there is a speech signal present in the scene. For example, the signaling information specifies that there is a speech signal when the speech signal is present in the scene. When there is a speech signal present in the scene, the signaling information can specify whether there are two or more speech signals present in the scene. Further, the signaling information can specify a number of the two or more speech signals if necessary.

In some embodiments, the signaling information can specify whether and how to use the speech signal(s) (when present in the scene) as a reference signal for the loudness adjustment, or use a default signal level as the reference signal level for loudness adjustment.

In an embodiment, the signaling information can specify whether one of the speech signals (when present in the scene) is taken and adjusted to the same loudness as the anchor speech signal for the loudness adjustment. If no speech signal is taken, a default signal level (e.g., loudness level of the anchor speech signal) can be used as the reference level for adjusting other sound signals.

In an embodiment, the signaling information can specify which of the speech signals present in the scene is taken and adjusted to the same loudness as the anchor speech signal, when it is determined that one of the speech signals is taken for the loudness adjustment.

In an embodiment, the signaling information can specify whether one of the speech signals (when present in the scene) is taken for the loudness adjustment. If it is determined that one of the speech signals is taken for the loudness adjustment, the speech signal that is taken and adjusted to the same loudness of the anchor speech signal can be determined based on characteristics (e.g., level or volume) of the speech signals. For example, the loudest speech signal present in the scene can be taken and adjusted to the same loudness as the anchor speech signal. In another example, the quietest speech signal present in the scene can be taken and adjusted to the same loudness as the anchor speech signal.

In an embodiment, the signaling information can specify whether one of the speech signals (when present in the scene) is taken for the loudness adjustment. If it is determined that one of the speech signals is taken for the loudness adjustment, the speech signal that is taken and adjusted to the same loudness of the anchor speech signal can be determined based on clustering of the speech signals. For example, a speech signal which is located closest to a clustering center of all speech signals present in the scene can be taken and adjusted to the same loudness as the anchor speech signal. The clustering center can be derived based on the locations of all speech signals.

In an embodiment, the signaling information can specify whether one of the speech signals (when present in the scene) is taken for the loudness adjustment. If it is determined that one of the speech signals is taken for the loudness adjustment, the speech signal that is taken and adjusted to the same loudness of the anchor speech signal can be determined based on an adjusted speech signal. For example, the adjusted speech signal can be generated based on the available speech signals in the scene, and be adjusted to the same loudness as the anchor speech signal.

In some embodiments, the signaling information can specify how the adjusted speech signal is generated based on the available speech signals in the scene. The adjusted speech signal can be determined based on an average or median of the speech signals or a subset of the speech signals. Further, the average can be weighted in some embodiments.

In an embodiment, the signaling information can specify whether the adjusted speech signal generated from the available speech signals (when present in the scene) is taken as the reference signal for the loudness level adjustment. If it is determined that the adjusted speech signal generated is taken as the reference signal for the loudness level adjustment, the adjusted speech signal can be an average of all speech signals present in the scene.

In an embodiment, the signaling information can specify whether the adjusted speech signal generated from the available speech signals (when present in the scene) is taken as the reference signal for the loudness level adjustment. If it is determined that the adjusted speech signal generated is taken as the reference signal for the loudness level adjustment, the adjusted speech signal can be an average of the loudest speech signal and the quietest speech signal present in the scene.

In an embodiment, the signaling information can specify whether the adjusted speech signal generated from the available speech signals (when present in the scene) is taken as the reference signal for the loudness level adjustment. If it is determined that the adjusted speech signal generated is taken as the reference signal for the loudness level adjustment, the adjusted speech signal can be a median of all speech signals present in the scene.

In an embodiment, the signaling information can specify whether the adjusted speech signal generated from the available speech signals (when present in the scene) is taken as the reference signal for the loudness level adjustment. If it is determined that the adjusted speech signal generated is taken as the reference signal for the loudness level adjustment, the adjusted speech signal can be an average of a quantile of all speech signals present in the scene.

In an embodiment, the signaling information can specify whether the adjusted speech signal generated from the available speech signals (when present in the scene) is taken as the reference signal for the loudness level adjustment. If it is determined that the adjusted speech signal generated is taken as the reference signal for the loudness level adjustment, the adjusted speech signal can be a weighted average of all speech signals present in the scene.

In an embodiment, the signaling information can specify that the weights are distance based. For example, the further away from the assumed center, the lower level the weight can be assigned.

In an embodiment, the signaling information can specify that the weights are loudness based. For example, the quieter the speech signal, the lower level the weight can be assigned.

An exemplary syntax table of the signaling information is shown in Table 1.

TABLE 1

| name | bit length | description |
|---|---|---|
| num_sound | 2 or more | number of sound signals in the scene |
| sound_id | 2 or more | identification index of the sound signal |
| is_speech_flag | 1 | whether this sound signal is speech |
| speech_present_flag | 1 | whether a speech signal is present in the scene |
| num_speech_signals | 2 or more | number of speech signals present in the scene |
| adjusted_speech_signal_method | 3 or more | how to create an adjusted speech signal |

In Table 1, the syntax element num_sound (e.g., 2 or more bits) indicates the number of sound signals in the audio scene. For each sound signal in the audio scene, the signaling information can include a respective syntax element sound_id (e.g., 2 or more bits), which specifies an identification index of the respective sound signal. For each sound signal in the audio scene, the signaling information can include a respective one bit flag is_speech_flag, which specifies whether the respective sound signal is a speech signal.

In an embodiment, the signaling information can include a one bit flag speech_present_flag, which specifies whether a speech signal is present in the scene.

In an embodiment, whether a speech signal is present in the scene can be determined by checking whether there is a sound signal that has the associated syntax element is_speech_flag being equal to 1.

In an embodiment, if it is determined that a speech signal is present in the scene, the signaling information can include a syntax element num_speech_signals (e.g., 2 or more bits), which specifies the number of speech signals present in the scene.

In an embodiment, the number of speech signals present in the scene can be derived by counting the number of sound signals in which each has the associated syntax element is_speech_flag being equal to 1.

In an embodiment, multiple loudness adjustment methods can be supported. The multiple loudness adjustment methods can include one or more methods described in this disclosure. In an example, a subset of these methods can be allowed.

In an embodiment, if the number of speech signals present in the scene is more than one, the signaling information can include a syntax element adjusted_speech_signal_method (e.g., 3 or more bits), which specifies how to generate an adjusted speech signal for the loudness adjustment.

Table 2 shows an exemplary signaling method for the loudness adjustment.

TABLE 2

```
AudioScene {
  num_sound
  ...
  sound_id
  is_speech_flag
  ...
  speech_present_flag
  if ( speech_present_flag ) {
    num_speech_signals
    if ( num_speech_signals > 1 ) {
      adjusted_speech_signal_method
      switch( adjusted_speech_signal_method ) {
        specified speech signal : {
        }
        loudest speech signal : {
        }
        quietest speech signal : {
        }
        clustering center : {
        }
        average of all speech signals : {
        }
        average of the loudest and quietest : {
        }
        median of all speech signals : {
        }
        average of a quantile : {
          left_quantile( );
          right_quantile( );
        }
        distance based weighted average : {
        }
        Loudness based weighted average : {
        }
      }
    }
  }
}
```

This disclosure includes a data structure for loudness adjustment signaling for an audio scene associated with an MPEG-I immersive audio stream. The data structure includes a first syntax element indicating a number of sound signals included in the audio scene in loudness adjustment information. A reference speech signal is determined from the one or more speech signals in response to one or more speech signals being determined to be included in the sound signals based on the first syntax element. A loudness level of the reference speech signal of the audio scene is adjusted based on an anchor speech signal. Loudness levels of the sound signals are adjusted based on the adjusted loudness level of the reference speech signal.

In an embodiment, the data structure includes a second syntax element indicating whether the one or more speech signals are included in the sound signals in the loudness adjustment information. The one or more speech signals are determined to be included in the sound signals based on the second syntax element indicating that the one or more speeches signals are included in the sound signals.

In an embodiment, the data structure includes a plurality of third syntax elements in the loudness adjustment information. Each of the third syntax elements indicates whether a respective one of the sound signals is a speech signal. The one or more speech signals are determined to be included in the sound signals based on at least one of the third syntax elements indicating that the respective one of the sound signals is the speech signal.

In an embodiment, the data structure includes a fourth syntax element indicating a number of the one or more speech signals included in the sound signals in the loudness adjustment information. The one or more speech signals are determined to be included in the sound signals based on the number of the one or more speech signals indicated by the fourth syntax element being greater than zero.

In an embodiment, the data structure includes a fifth syntax element indicating the reference speech signal in the loudness adjustment information based on a number of the one or more speech signals being greater than one.

In an embodiment, the data structure includes a plurality of sixth syntax elements in the loudness adjustment information. Each of the sixth syntax elements indicates an identification index of a respective one of the sound signals.

II. Flowchart

Figure 2:
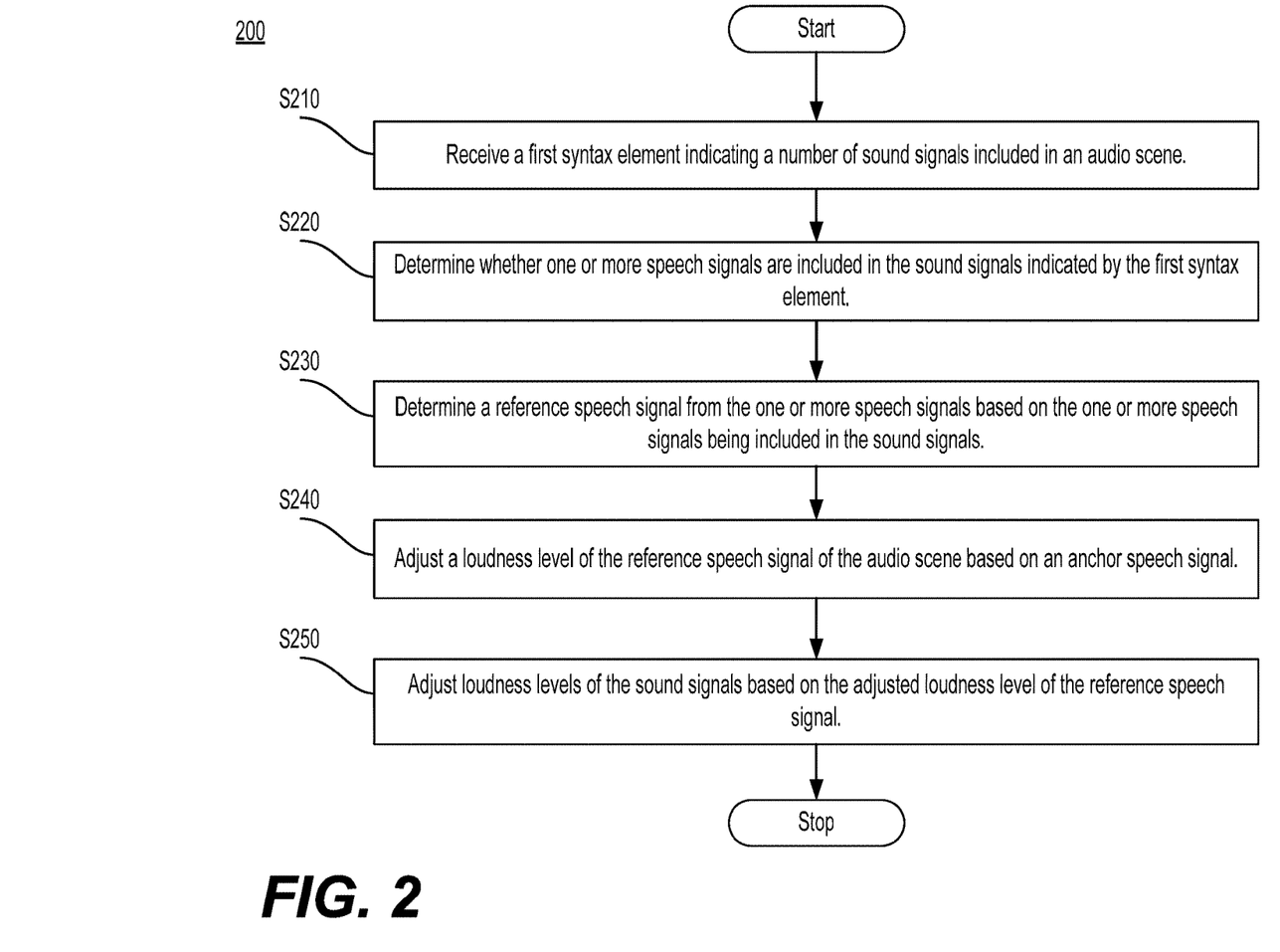
FIG. 2 shows an exemplary flowchart according to an embodiment of the disclosure.
Figure 3:
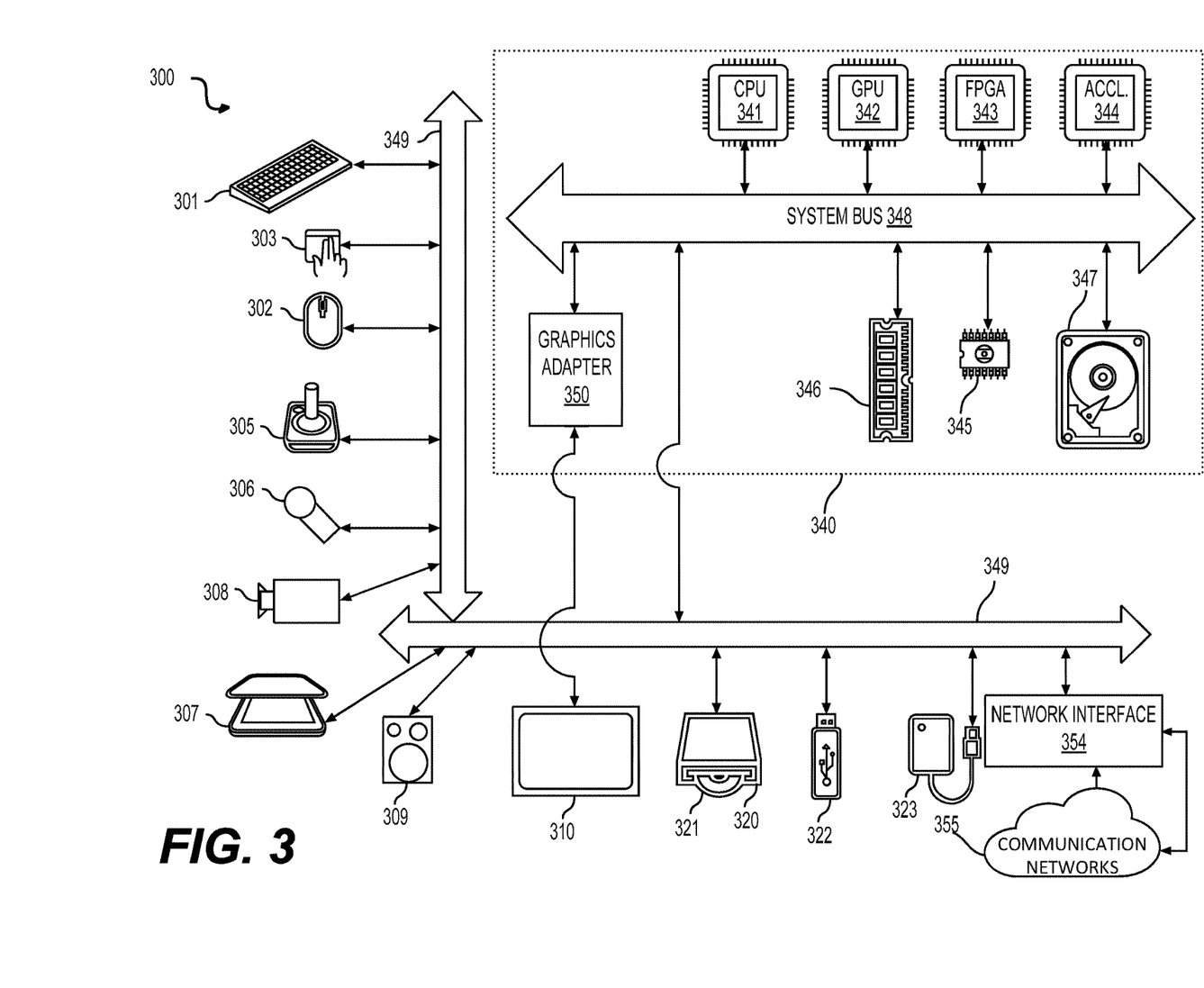
FIG. 3 is a schematic illustration of a computer system according to an embodiment of the disclosure.

FIG. 2 shows a flow chart outlining an exemplary process (200) according to an embodiment of the disclosure. In various embodiments, the process (200) is executed by processing circuitry, such as the processing circuitry as shown in FIG. 3. In some embodiments, the process (200) is implemented in software instructions, thus when the processing circuitry executes the software instructions, the processing circuitry performs the process (200).

The process (200) may generally start at step (S210), where the process (200) receives a first syntax element indicating a number of sound signals included in an audio scene. Then, the process (200) proceeds to step (S220).

At step (S220), the process (200) determines whether one or more speech signals are included in the sound signals indicated by the first syntax element. Then, the process (200) proceeds to step (S230).

At step (S230), the process (200) determines a reference speech signal from the one or more speech signals based on the one or more speech signals being included in the sound signals. Then, the process (200) proceeds to step (S240).

At step (S240), the process (200) adjusts a loudness level of the reference speech signal of the audio scene based on an anchor speech signal. Then, the process (200) proceeds to step (S250).

At step (S240), the process (200) adjusts loudness levels of the sound signals based on the adjusted loudness level of the reference speech signal. Then, the process (200) terminates.

In an embodiment, the process (200) receives a second syntax element indicating whether the one or more speech signals are included in the sound signals. The process (200) determines that the one or more speech signals are included in the sound signals based on the second syntax element indicating that the one or more speeches signals are included in the sound signals.

In an embodiment, the process (200) receives a plurality of third syntax elements, each of the third syntax elements indicating whether a respective one of the sound signals is a speech signal. The process (200) determines that the one or more speech signals are included in the sound signals based on at least one of the third syntax elements indicating that the respective one of the sound signals is the speech signal.

In an embodiment, the process (200) receives a fourth syntax element indicating a number of the one or more speech signals included in the sound signals. The process (200) determines that the one or more speech signals are included in the sound signals based on the number of the one or more speech signals indicated by the fourth syntax element being greater than zero.

In an embodiment, the process (200) receives a fifth syntax element indicating the reference speech signal based on a number of the one or more speech signals being greater than one.

In an embodiment, the process (200) receives a plurality of sixth syntax elements, each of the sixth syntax elements indicating an identification index of a respective one of the sound signals.

In an embodiment, the process (200) determines that no speech signal is included in the sound signals. The process (200) adjusts the loudness levels of the sound signals based on a default reference signal.

III. Computer System

The techniques described above, can be implemented as computer software using computer-readable instructions and physically stored in one or more computer-readable media. For example, FIG. 3 shows a computer system (300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 3 for computer system (300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (300).

Computer system (300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (301), mouse (302), trackpad (303), touch screen (310), data-glove (not shown), joystick (305), microphone (306), scanner (307), and camera (308).

Computer system (300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (310), data-glove (not shown), or joystick (305), but there can also be tactile feedback devices that do not serve as input devices), audio output devices (such as: speakers (309), headphones (not depicted)), visual output devices (such as screens (310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (310)) can be connected to a system bus (348) through a graphics adapter (350).

Computer system (300) can also include human accessible storage devices and their associated media such as optical media including CD/DVD ROM/RW (320) with CD/DVD or the like media (321), thumb-drive (322), removable hard drive or solid state drive (323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (300) can also include a network interface (354) to one or more communication networks (355). The one or more communication networks (355) can for example be wireless, wireline, optical. The one or more communication networks (355) can further be local, wide-area, metropolitan, vehicular and industrial, real-time, delay-tolerant, and so on. Examples of the one or more communication networks (355) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (349) (such as, for example USB ports of the computer system (300)); others are commonly integrated into the core of the computer system (300) by attachment to a system bus as described below (for example Ethernet interface into a PC computer system or cellular network interface into a smartphone computer system). Using any of these networks, computer system (300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (340) of the computer system (300).

The core (340) can include one or more Central Processing Units (CPU) (341), Graphics Processing Units (GPU) (342), specialized programmable processing units in the form of Field Programmable Gate Areas (FPGA) (343), hardware accelerators for certain tasks (344), and so forth. These devices, along with Read-only memory (ROM) (345), Random-access memory (346), internal mass storage such as internal non-user accessible hard drives, SSDs, and the like (347), may be connected through the system bus (348). In some computer systems, the system bus (348) can be accessible in the form of one or more physical plugs to enable extensions by additional CPUs, GPU, and the like. The peripheral devices can be attached either directly to the core's system bus (348), or through a peripheral bus (349). Architectures for a peripheral bus include PCI, USB, and the like.

CPUs (341), GPUs (342), FPGAs (343), and accelerators (344) can execute certain instructions that, in combination, can make up the aforementioned computer code. That computer code can be stored in ROM (345) or RAM (346). Transitional data can also be stored in RAM (346), whereas permanent data can be stored for example, in the internal mass storage (347). Fast storage and retrieve to any of the memory devices can be enabled through the use of cache memory, that can be closely associated with one or more CPU (341), GPU (342), mass storage (347), ROM (345), RAM (346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (300) and specifically the core (340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (340) that are of non-transitory nature, such as core-internal mass storage (347) or ROM (345). The software implementing various embodiments of the present disclosure can be stored in such devices and executed by core (340). A computer-readable medium can include one or more memory devices or chips, according to particular needs. The software can cause the core (340) and specifically the processors therein (including CPU, GPU, FPGA, and the like) to execute particular processes or particular parts of particular processes described herein, including defining data structures stored in RAM (346) and modifying such data structures according to the processes defined by the software. In addition or as an alternative, the computer system can provide functionality as a result of logic hardwired or otherwise embodied in a circuit (for example: accelerator (344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for loudness adjustment in an audio scene associated with an MPEG-I immersive audio stream, the method comprising:
   receiving a data structure including (i) a first syntax element indicating a number of sound signals included in the audio scene, (ii) a second syntax element indicating a number of speech signals included in the sound signals, and (iii) a third syntax element indicating an identifier of a reference speech signal;
   determining, based on the second syntax element in the received data structure, the number of the speech signals included in the sound signals of the audio scene indicated by the first syntax element;
   in response a determination that more than one speech signal is included in the sound signals of the audio scene,
      determining a reference speech signal from the more than one speech signals based on the third syntax element in the received data structure;
      adjusting a loudness level of the reference speech signal of the audio scene based on an anchor speech signal; and
      adjusting loudness levels of the sound signals based on the adjusted loudness level of the reference speech signal.

2. The method of claim 1, wherein
   the received data structure includes a fourth syntax element indicating whether one or more speech signals are included in the sound signals, and
   the method further includes determining that one or more speech signals are included in the sound signals based on the fourth syntax element indicating that the one or more speech signals are included in the sound signals.

3. The method of claim 2, wherein
   the received data structure includes a plurality of fifth syntax elements, each of the fifth syntax elements indicating whether a respective one of the sound signals is a speech signal, and
   the determining that the one or more speech signals are included in the sound signals is based on at least one of the fifth syntax elements indicating that the respective one of the sound signals is the speech signal.

4. The method of claim 2, wherein
   the determining that the one or more speech signals are included in the sound signals is based on the number of the speech signals indicated by the second syntax element being greater than zero.

5. The method of claim 1, wherein the determining the reference speech signal is based on the number of the speech signals indicated by the second syntax element being greater than one.

6. The method of claim 1, wherein
   the received data structure includes a plurality of sixth syntax elements, each of the sixth syntax elements indicating an identification index of a respective one of the sound signals.

7. The method of claim 1, wherein
   the method further includes determining that no speech signal is included in the sound signals, and
   the adjusting the loudness levels of the sound signals includes adjusting the loudness levels of the sound signals based on a default reference signal.

8. An apparatus, comprising:
   processing circuitry configured to:
      receive a data structure including (i) a first syntax element indicating a number of sound signals included in an audio scene, (ii) a second syntax element indicating a number of speech signals included in the sound signals, and (iii) a third syntax element indicating an identifier of a reference speech signal;
      determine, based on the second syntax element in the received data structure, the number of the speech signals included in the sound signals of the audio scene indicated by the first syntax element;
      in response a determination that more than one speech signal is included in the sound signals of the audio scene,
         determine a reference speech signal from the more than one speech signals based on the third syntax element in the received data structure;
         adjust a loudness level of the reference speech signal of the audio scene based on an anchor speech signal; and
      adjust loudness levels of the sound signals based on the adjusted loudness level of the reference speech signal.

9. The apparatus of claim 8, wherein
   the received data structure includes a fourth syntax element indicating whether the one or more speech signals are included in the sound signals; and
   the processing circuitry is further configured to determine that one or more speech signals are included in the sound signals based on the fourth syntax element indicating that the one or more speech signals are included in the sound signals.

10. The apparatus of claim 9, wherein
    the received data structure includes a plurality of fifth syntax elements, each of the fifth syntax elements indicating whether a respective one of the sound signals is a speech signal; and
    determine that the one or more speech signals are included in the sound signals is based on at least one of the fifth syntax elements indicating that the respective one of the sound signals is the speech signal.

11. The apparatus of claim 9, wherein the processing circuitry is configured to:
    determine that the one or more speech signals are included in the sound signals based on the number of the speech signals indicated by the second syntax element being greater than zero.

12. The apparatus of claim 8, wherein the processing circuitry is configured to:
    determine the reference speech signal based on the number of the speech signals indicated by the second syntax element being greater than one.

13. The apparatus of claim 8, wherein
the received data structure includes a plurality of sixth syntax elements, each of the sixth syntax elements indicating an identification index of a respective one of the sound signals.

14. The apparatus of claim 8, wherein the processing circuitry is configured to:
determine that no speech signal is included in the sound signals; and
adjust the loudness levels of the sound signals based on a default reference signal.

15. A method for loudness adjustment signaling for an audio scene associated with an MPEG-I immersive audio stream, the method comprising:
generating a data structure including (i) a first syntax element indicating a number of sound signals included in the audio scene, (ii) a second syntax element indicating a number of speech signals included in the sound signals, and (iii) a third syntax element indicating an identifier of a reference speech signal, wherein
a number of speech signals included in the sound signals of the audio scene is determined based on the second syntax element in the generated data structure, and
in response a determination that more than one speech signal is included in the sound signals of the audio scene,
a reference speech signal is determined from the more than one speech signals based on the third syntax element in the generated data structure,
a loudness level of the reference speech signal of the audio scene is adjusted based on an anchor speech signal, and
loudness levels of the sound signals are adjusted based on the adjusted loudness level of the reference speech signal.

16. The method of claim 15, further comprising:
including in the generated data structure a fourth syntax element indicating whether the speech signals are included in the sound signals, and
the speech signals are determined to be included in the sound signals based on the fourth syntax element indicating that the speech signals are included in the sound signals.

17. The method of claim 15, further comprising:
including in the generated data structure a plurality of fifth syntax elements, each of the fifth syntax elements indicating whether a respective one of the sound signals is a speech signal,
wherein the speech signals are determined to be included in the sound signals based on at least one of the fifth syntax elements indicating that the respective one of the sound signals is the speech signal.

18. The method of claim 15, further comprising:
wherein the speech signals are determined to be included in the sound signals based on the number of the speech signals indicated by the second syntax element being greater than zero.

19. The method of claim 15, wherein
the reference speech signal is determined based on the number of the speech signals indicated by the second syntax element being greater than one.

20. The method of claim 15, further comprising:
including in the generated data structure a plurality of sixth syntax elements in the loudness adjustment information, each of the sixth syntax elements indicating an identification index of a respective one of the sound signals.

* * * * *